United States Patent [19]

Mortrud

[11] Patent Number: 5,586,730
[45] Date of Patent: Dec. 24, 1996

[54] FLUORESCENT LAMP COLLECTION AND SEPARATION METHOD AND APPARATUS

[75] Inventor: Jon P. Mortrud, Cottage Grove, Wis.

[73] Assignee: Budget Lamp Reclaimers, Inc., Madison, Wis.

[21] Appl. No.: 402,203

[22] Filed: Mar. 10, 1995

[51] Int. Cl.$^6$ ................................................. B02C 19/12
[52] U.S. Cl. ..................... 241/24.22; 241/79.1; 241/99; 241/100; 241/101.741; 241/152.2; 241/200
[58] Field of Search ............................. 241/99, DIG. 38, 241/24.22, 24.3, 100, 101.741, 101.74, 29, 152.2, 260.1, 79.1, 200, 57; 588/900

[56] References Cited

U.S. PATENT DOCUMENTS

| | | |
|---|---|---|
| 2,593,657 | 4/1952 | Coon et al. . |
| 2,620,988 | 12/1952 | Tellier . |
| 2,628,036 | 2/1953 | Hall . |
| 2,866,604 | 12/1958 | Hall . |
| 2,961,977 | 11/1960 | Coleman ................. 241/101.741 X |
| 3,913,849 | 10/1975 | Atanasoff et al. . |
| 4,545,540 | 10/1985 | Nakamura . |
| 4,655,404 | 4/1987 | Deklerow . |
| 4,786,003 | 11/1988 | Johnson ...................... 241/101.741 |
| 4,795,103 | 1/1989 | Lech . |
| 4,840,314 | 6/1989 | Kulander . |
| 4,852,815 | 8/1989 | Giannotti ................. 241/101.741 X |
| 5,042,724 | 8/1991 | Perry . |
| 5,092,527 | 3/1992 | Perry et al. . |
| 5,106,598 | 4/1992 | Cogar . |
| 5,167,184 | 12/1992 | Rebecchi . |
| 5,205,497 | 4/1993 | Deklerow . |
| 5,388,773 | 2/1995 | Perry ............................. 241/24.22 X |

*Primary Examiner*—Mark Rosenbaum
*Attorney, Agent, or Firm*—Foley & Lardner

[57] ABSTRACT

A mobile vehicle containing fluorescent lamp separation apparatus is transported to the site of a facility which uses fluorescent lamps and collects used lamps for processing. The lamps are loaded into a bin in the vehicle, the bin is closed to enclose the apparatus from the atmosphere, and the apparatus is then operated to crush the lamps and separate the crushed lamp debris into solid particular matter and dust which can be carried by airflow. The particulate matter which is substantially cleansed of mercury and phosphor powder is discharged into a first receptacle outside the vehicle, and the dust entrained in the air is trapped in a dust filter and discharged into a second receptacle which primarily contains the more hazardous dust materials. The air drawn through the dust filter is further passed through a charcoal filter to filter out mercury and other potentially hazardous vapors from the air before it is discharged to the atmosphere. The particulate matter in the first receptacle is substantially cleansed of mercury, phosphors and other potentially hazardous materials, and may be disposed of in the same manner as conventional waste. The second receptacle contains the much smaller volume of potentially hazardous phosphor powders, and can be retained at the site of the facility or disposed in an appropriate manner as hazardous waste. After completing processing at the facility site, the vehicle is transported to the site of another facility where the process is repeated, thereby avoiding the need to transport the bulky and fragile fluorescent lamps from the facility at which they are used to a landfill or to a central lamp processing site.

27 Claims, 8 Drawing Sheets

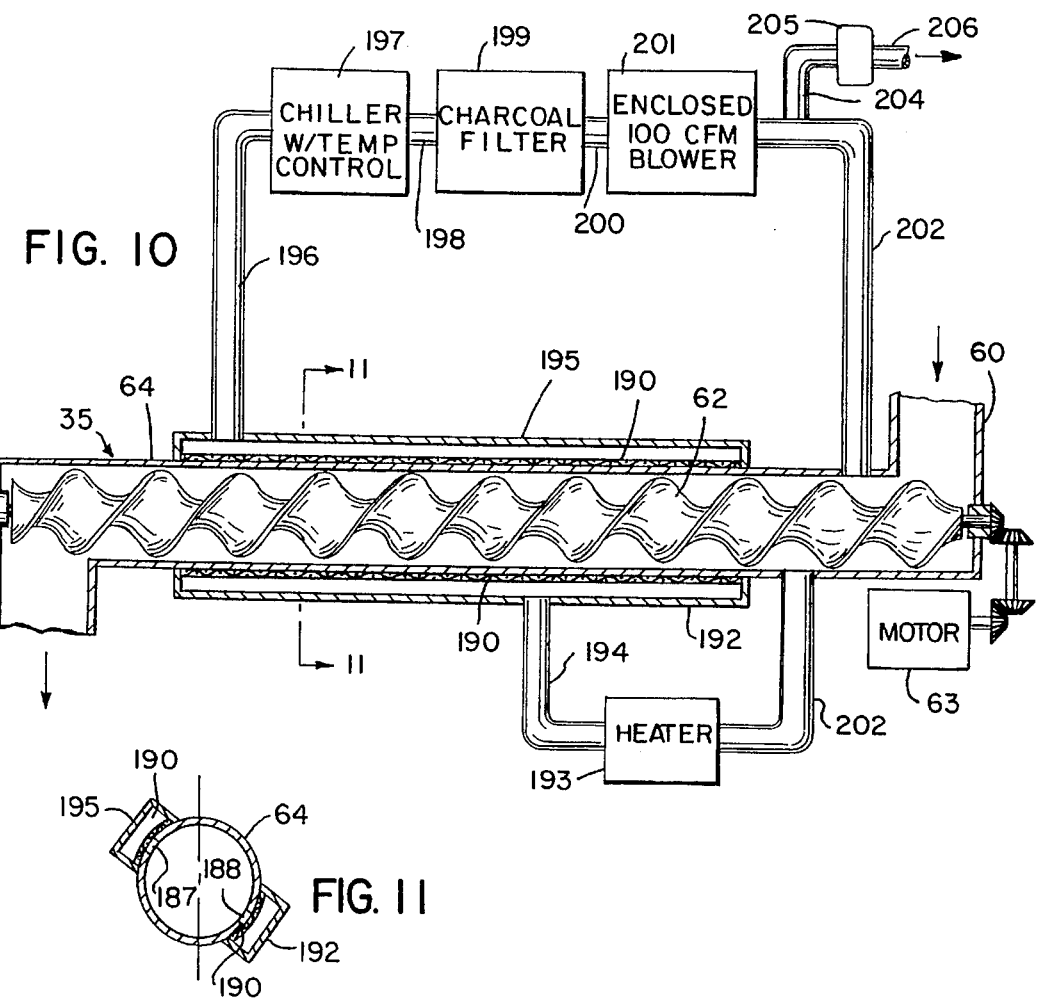
FIG. 10
FIG. 11
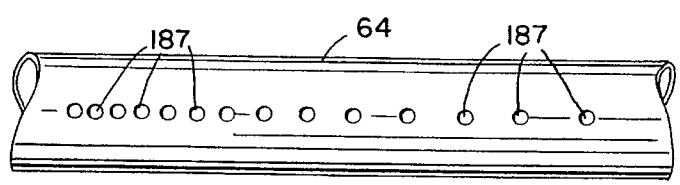
FIG. 12
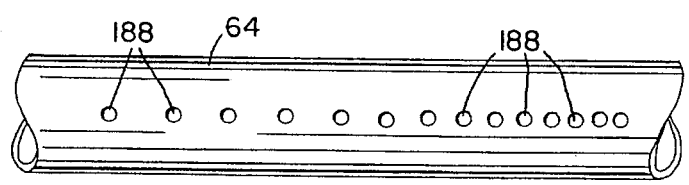
FIG. 13

FLUORESCENT LAMP COLLECTION AND SEPARATION METHOD AND APPARATUS

FIELD OF THE INVENTION

This invention pertains generally to the field of waste separation and disposal, and particularly to the treatment and disposal of fluorescent lamps.

BACKGROUND OF THE INVENTION

The problem of safe and effective disposal of used fluorescent lamps has long been known. When fluorescent lamps are crushed, the mercury vapor as well as other vapors enclosed within the tube can be released to the atmosphere, and the fluorescent coatings on the inside of the tube, formed of phosphorous or other phosphors, may also be partially released to the atmosphere. In addition, when lamp waste is disposed of in landfills, residual mercury and phosphors may leach into the ground. The mercury vapor within the tube, any liquid mercury remaining in the tube debris, and the phosphor coatings may be environmentally hazardous and/or toxic materials.

As the potential for environmental damage from the disposal in landfills of fluorescent lamps (as well as other lamps which contain similar hazardous materials) has been more fully recognized, significant efforts have been made to dispose of the lamps in a manner which has less impact on the environment. Typically, facilities such as factories, schools, office buildings, and so forth which accumulate a large number of used or burned out fluorescent lamps are being required by environmental regulations to attend to the disposal of the lamps in an environmentally acceptable manner. As an alternative to the direct disposal of the lamps in existing landfills, the lamps may be transported from the facility at which the lamps were used to a central processing plant where the lamps are crushed and processed before being landfilled. Lamp reclamation operations have been established for the processing of fluorescent lamps in a manner which separates the hazardous powders and the mercury vapors from the glass of the tubes and the metal of the end caps and filaments before disposal. Such processing plants can produce crushed glass and metal debris which has been sufficiently cleaned of hazardous materials as to be acceptable for deposit in landfills or for possible recycling without posing a hazard to the environment. The accumulated hazardous and toxic materials, such as the phosphor powders and the mercury vapor, may be separately disposed of in manners which are approved for such more toxic materials.

The processing of fluorescent lamps as described above is environmentally desirable, but carries with it certain environmental risks as well as economic costs. The need to transport large volumes of used fluorescent lamps from the facilities at which they are generated to a central processing plant involves handling and transportation steps which inevitably leads to some breakage of lamp tubes and release of potentially toxic mercury vapor and other materials. In addition to the potentially serious environmental risk from lamp breakage, the collection and transportation of the bulky lamps from the facility at which they are generated to a central processing plant results in significant handling and transportation costs in addition to the cost of carrying out the actual crushing and separation at the central processing facility. These costs are borne by the facility that generates the fluorescent lamps, which makes disposal of the lamps by reprocessing often a more expensive route than direct disposal in landfills. Consequently, it is less likely that lamp reprocessing will be availed of where the facility generating the lamps has a choice as to the manner of disposal.

Systems have been proposed for crushing and processing fluorescent lamps at the site where the lamps are used, rather than at a central processing plant, but such systems are typically too expensive to be economically practical since they are generally used sporadically, and small and inexpensive processing systems usually do not efficiently separate glass from phosphor powders or thoroughly trap the mercury vapor released from the lamps.

Whether the lamps are landfilled or reprocessed, if fluorescent lamps are classified as hazardous waste they can only be transported by a licensed hazardous waste hauler, typically at greater expense than the transport of nonhazardous waste. Moreover, the facility which generates the used lamps may bear long term responsibility under environmental laws for the proper disposal of the lamps, including responsibility for improper handling and disposal of the lamps by waste haulers.

SUMMARY OF THE INVENTION

In accordance with the present invention, the collection of fluorescent lamps (and similar lamps) and the crushing and separation of the hazardous from nonhazardous components of the lamps is carried out in a manner which is efficient, environmentally safe, and economical. In the present invention, a mobile vehicle carries the fluorescent lamp crushing and separation apparatus of the invention to the location of a facility which generates and accumulates used fluorescent lamps. These lamps are accumulated on site at the facility as the lamps burn out, thereby minimizing transportation or handling of the lamps. The crushing of lamps and separation of lamp debris takes place in the mobile vehicle at the facility site, rather than at a central processing plant, so that no further transport of the uncrushed lamps is necessary.

The separation apparatus on the vehicle crushes the lamps, removes mercury and other hazardous gases which are released from the lamps as they are crushed, and separates the hazardous solid powders from the nonhazardous crushed glass and end cap metal of the lamps. The crushed glass and metal solid waste is discharged from the vehicle into a first waste receptacle containing waste which has been sufficiently cleansed of hazardous material as to be directly deposited in landfills without constituting an environmental hazard. The materials collected in the first waste receptacle are not classified as hazardous materials under environmental regulations and may be disposed of as normal solid waste. Potentially hazardous phosphorous powder or other dust released from the fluorescent lamps is collected in a second waste receptacle. For any load of fluorescent lamps processed, the volume of the powders collected in the second waste receptacle will be far less than the volume of the crushed glass and metal in the first waste receptacle. The second waste receptacle contains the potentially hazardous waste, which must be disposed of in accordance with environmental regulations. This hazardous material may be left at the site of the facility generating the used lamps for storage on-site in a manner which meets environmental regulations, since the material is dry and has a small volume. Alternatively, the hazardous waste material may be shipped by a licensed hazardous waste hauler for ultimate disposal in an environmentally sound manner. Because of the relatively small volume of such hazardous waste, the cost of having the material disposed of is significantly less than would be required to have the bulky used fluorescent lamps hauled and disposed of by a licensed hazardous waste hauler.

In a preferred mobile vehicle, an enclosure mounted on a wheeled truck body has an end door which can be closed to substantially seal in the separation apparatus. Fluorescent lamps are loaded at the facility site into a collection bin in the enclosure, a door of the collection bin is closed to substantially seal the collection bin from the ambient atmosphere (and the enclosure door is also preferably closed), and the apparatus is turned on to move the lamps in the collection bin to a crusher. The glass and other solids of the lamps are reduced to a small size in the crusher and are transported, preferably by screw auger conveyors, to a glass particulate and dust separator. In the separator, the larger glass and metal particles are separated from the much smaller and lighter dust particles which are carried by air jets from the separator to exhaust conduits, while the heavier glass and metal particles fall by gravity to the bottom of the separator. The glass and metal particles are at this point substantially freed of the dust and may be conveyed to the first waste receptacle. These particles may be further cleansed of liquids and gases adhering to or absorbed in the particles by applying heat to the particles, with the evolved gas being drawn off in a circulating loop through a filter to remove the gases from the ambient air.

The dust which is separated from the glass and metal particles is drawn through exhaust conduits to a dust filter unit which allows the air to pass through but entrains the dust. The air passed through the filter is drawn through an additional set of fine filters to filter out any remaining small microparticles which have passed through the main dust filter, and then the air is drawn through a charcoal filter bed which absorbs potentially hazardous vapors (e.g., mercury) from the air before the air is discharged to the ambient atmosphere outside the truck enclosure. The air discharged is made up by air drawn into the collection bin, with all of the crushing and conveying components of the system being substantially sealed from the outside atmosphere and under a substantially negative pressure with respect to the ambient atmosphere so that gases and dust do not escape from the system.

Separation of the crushed glass particles from dust is carried out without the use of water or other washing liquids, so that all waste material is completely dry. The dry condition of the waste facilitates its storage and disposal, and avoids the possibility of leakage of liquids into the environment, or the need to subsequently dry wet materials.

Crushing of the lamps in the crusher is preferably carried out utilizing an efficient system of crush bars carried on endless chains which engage the lamps passing from the collection bin into the moving crush bars. The multiple crush bars break the glass and metal end caps into relatively small pieces which are delivered to crusher rollers which engage and grind the debris into relatively small fine particles, and in the process help to begin freeing the powder dust from the larger glass and metal particulates. The conveyors which convey the mixed debris from the crusher to the glass and dust separator are preferably augers rotating inside sealed tubes which push the glass and metal particulates and dust along by the action of a rotating screw blade of the auger. The auger blade action further helps to grind the particulates into smaller particles and to free the powder coating from the glass so that the powder is only loosely held on the surface of the glass or is completely freed from the glass particles.

Further objects, features and advantages of the invention will be apparent from the following detailed description when taken in conjunction with the accompanying drawings.

BRIEF DESCRIPTION OF THE DRAWINGS

In the drawings:

FIG. 10 is a schematic view of another closed circuit particulate heater system which may be utilized in the apparatus of FIG. 2.

FIG. 11 is a partial cross-sectional view of the discharge conveyor of FIG. 10 taken generally along the lines 11—11 of FIG. 10.

FIG. 12 is a top view of the discharge conveyor tube of FIG. 10.

FIG. 13 is a bottom view of the discharge conveyor tube of FIG. 10.

DETAILED DESCRIPTION OF THE INVENTION

Figure 1:
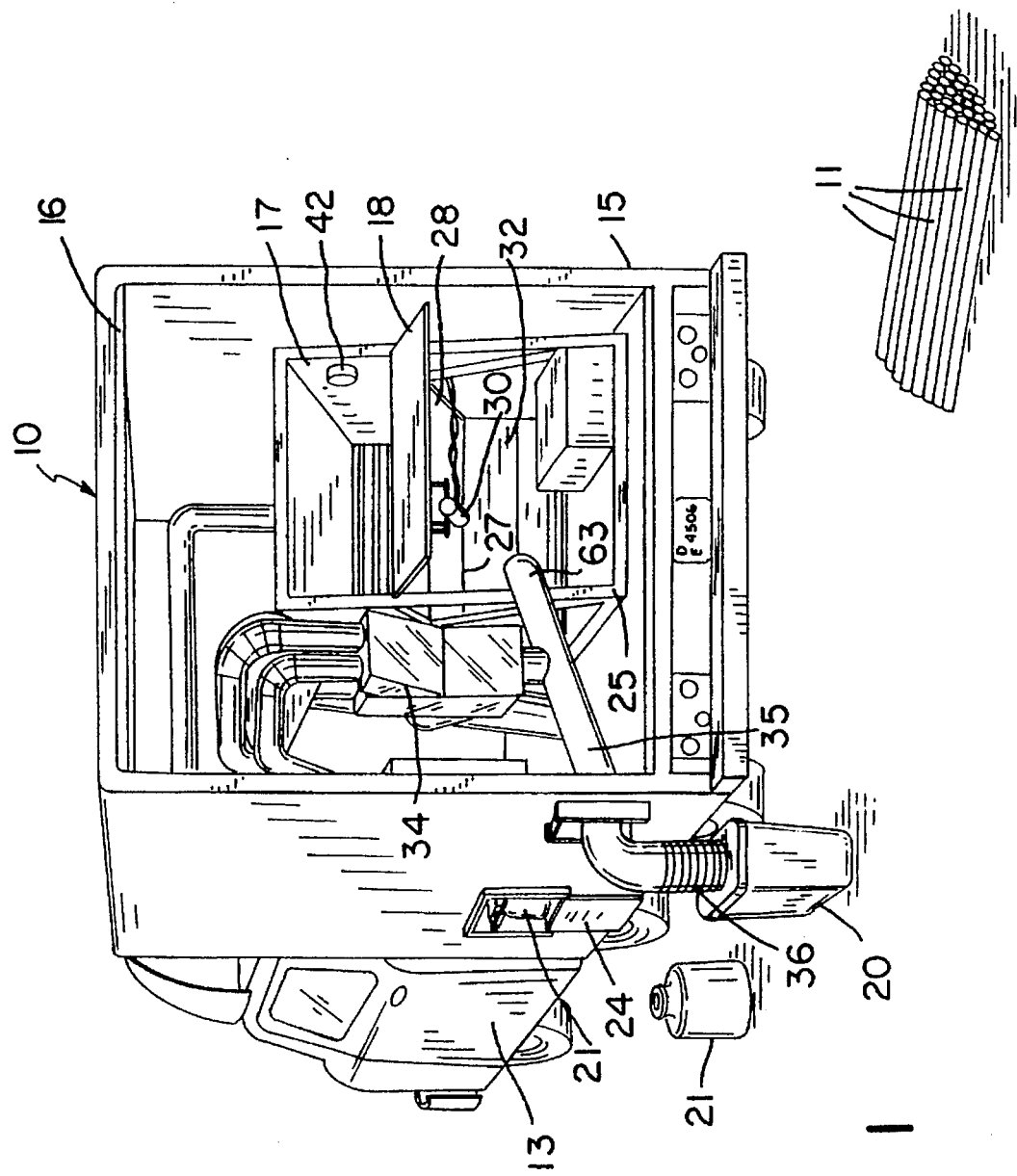
FIG. 1 is a perspective view of a mobile vehicle in accordance with the present invention for fluorescent lamp collection and separation.

With reference to the drawings, a mobile fluorescent lamp collection and separation vehicle in accordance with the present invention is shown generally at 10 in FIG. 1, positioned at the site of a facility which generates used fluorescent lamps, illustratively shown stacked at 11. The lamps 11 are collected from the generating facility, for example, a manufacturing plant, office building, school, and so forth, as the lamps burn out. They may be collected on site at the facility in any appropriate manner, requiring only that they be stored in preparation for processing in bulk utilizing the mobile vehicle 10 of the invention, which can be driven to the facility site when needed or on a periodic basis. The mobile vehicle 10 is illustratively shown as comprising a conventional truck body and wheeled undercarriage 13, with a box enclosure 15 mounted on the truck body. The truck enclosure 15 is shown opened in FIG. 1, with a fold-up door 16 at the back end of the truck being shown in its opened position. As discussed further below, the door 16 can be closed to substantially isolate the interior of the enclosure 15 from the outside ambient atmosphere. The collection and recycling apparatus of the present invention is wholly contained within the enclosure 15. Although the invention is illustrated with reference to a self-propelled truck, other mobile vehicle structures may also be utilized, for example, trailers or railroad cars.

The fluorescent lamps 11 are deposited by an operator into a collection bin 17 which is closed by a door 18 when the lamps have been loaded therein. Typically, many lamps are loaded at the same time into the bin 17 for processing. The enclosure door 16 may then also be closed and the apparatus of the invention within the box 15 may be turned on by an operator by closing an electrical switch (not shown in FIG. 1). The fluorescent lamps are crushed and the lamp debris is separated into two parts, the first part, which is discharged out of the apparatus into a first receptacle 20, comprising glass and metal particles which have been substantially cleaned of the phosphors and other dust materials which coated the inside of the glass tubes of the fluorescent lamps. A second receptacle 21, which may generally be of a much smaller size, receives the phosphor dust and other dust which have been separated from the glass and metal particulates. The receptacle 21 is shown mounted in a recess in the truck enclosure which can be closed by a door 24, and another of the receptacles 21 is shown on the ground next to the truck to illustrate the portability of the second receptacle 21. Generally, for a given number of fluorescent lamps which are processed, the volume of the glass and metal particulate in the receptacle 20 may be a hundred times (or more) greater than the volume (and weight) of the potentially hazardous material in the container 21. The material in the container 20 is normal waste, and can be disposed of in a conventional fashion with other nonhazardous waste. The material in the container 21 may be classified as hazardous waste, and requires appropriate handling and disposal. Because of the small volume of the material in the receptacle 21, it may be left on-site at the facility which generated the used lamps for long term storage. Typically, the receptacle 21 will only be partially filled during the running of any batch of fluorescent lamps 11, and thus may be used again at a subsequent visit of the vehicle 10 to the facility site where it receives additional powder dust as a result of the processing. At smaller facilities, several visits of the vehicle to the facility may occur before the second receptacle 21 is filed.

The separation procedure as described above thus allows the relatively small amount of potentially hazardous waste 21 to be handled in a manner which is at the discretion of the operator of the facility which generates the used lamps. Long term storage at the site of the facility may be feasible. Alternatively, the potentially hazardous material 21 may be provided to a hazardous waste hauler for disposal in a manner appropriate to waste materials of this type. If a receptacle 21 is used which is kept at the facility site through several processing visits of the vehicle 10, the transport of the hazardous material may be deferred until a time when the container is substantially full. Depending on the size of the facility, and so forth, this time may be several months or several years. As a result, the services of licensed waste haulers are needed far less often than would be the case if the waste haulers are required to haul the original voluminous tubes 11, and the cost of transporting the relatively small volume receptacle 21 is commensurately much less than that for transporting large volumes of lamps in their original condition.

As illustratively shown in FIG. 1, the collection bin 17 is mounted on a metal frame 25 which supports the bin 17 at a declining angle from the opening (closed by the door 18) to the discharge end 27 of the bin. The bottom panel 28 of the bin 17, which declines at an angle toward the discharge end 27, has an electric motor-driven vibrator 30 attached thereto to shake the bottom panel 28 to facilitate the controlled sliding of fluorescent lamps deposited into the bin 17 toward the discharge end 27. A material which has been found suitable for forming the walls and bottom panel 28 of the bin 17 is polycarbonate (e.g., Tuffex™ polycarbonate from Auto House, G.E. Lexan™, or Sheffield Plastics Hyzode™) for durability, resistance to absorption of mercury vapor or other gases, and ability to be shaked by the vibrator 30 without damage. Other components of the apparatus of the invention shown illustratively in FIG. 1 include a portion of a crusher 32 which receives the lamps 11 from the discharge end 27 of the bin 17, a glass and dust separator 34, a discharge conveyor 35 which discharges the glass received from the separator 34 through a chute 36 to the receptacle 20, and air circulation conduits described further below.

Figure 2:
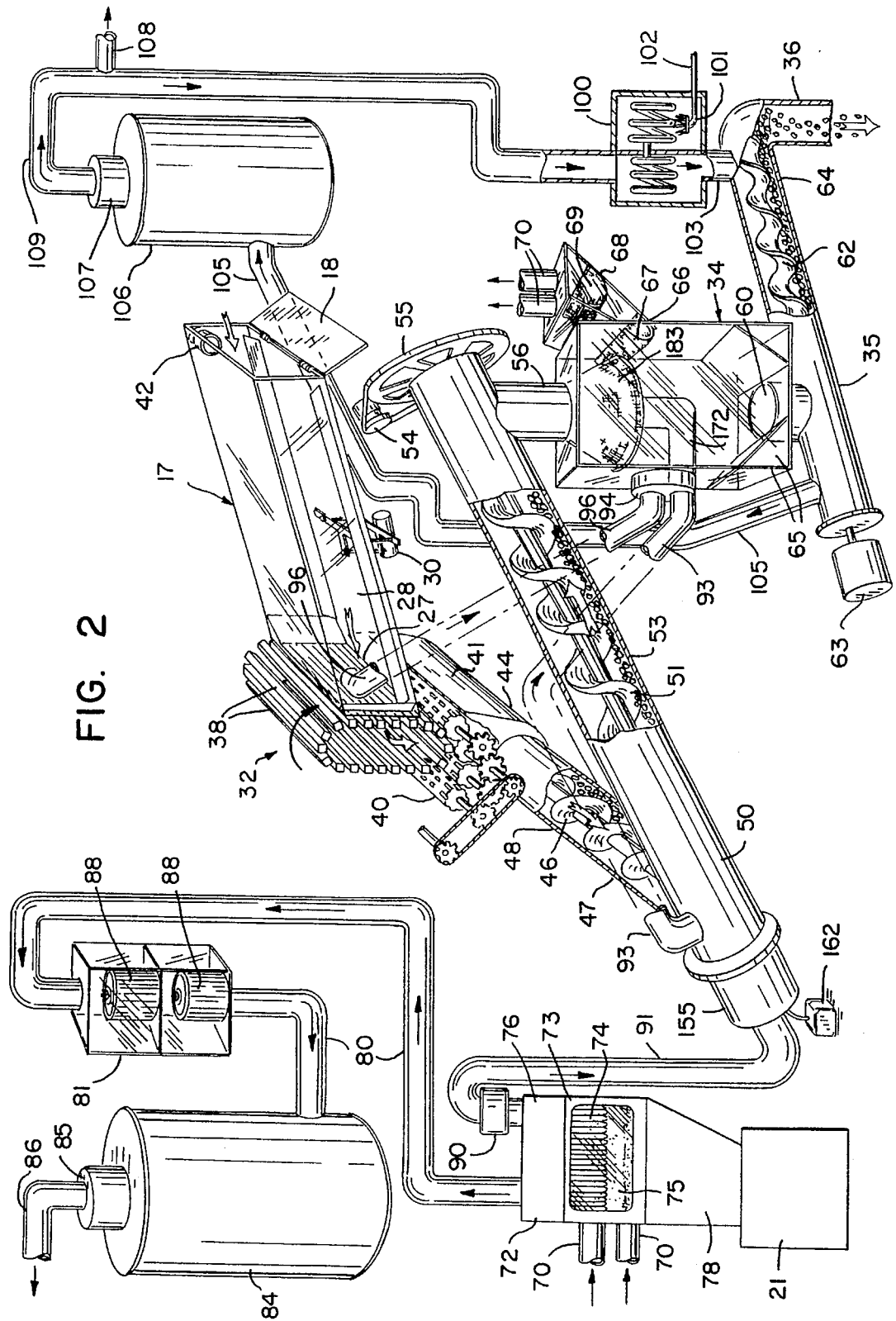
FIG. 2 is an illustrative view of the components of the collection and separation apparatus of the present invention mounted within the vehicle of FIG. 1.

The operative components of the apparatus of the invention which are mounted within the enclosure 15 are shown illustratively in FIG. 2, with the parts shown with greater separation from one another to facilitate understanding of the invention. The lamps 11 which are fed into the bin 17 reach moving crusher bars 38 which are mounted at their ends on chains (not shown in FIG. 2) to move in essentially parallel downward motion to engage the lamps at the discharge end 27 of the bin. The lamps are crushed between the moving bars 38 and an edge formed at the end 27, the edge preferably being reinforced with steel or other durable metal. The spacing between the bars 38 is sufficient to admit a fluorescent lamp tube of typical diameter, and to break it as it moves to the discharge end 27 of the bin. The moving crusher bars 38 crush a small portion of the fluorescent tubes as each bar 38 passes the crushing edge of the discharge end 27, ensuring that the fluorescent tubes are initially broken into small pieces. The broken bits of tube, powder, metal end cap, filament, etc. fall by gravity or are carried by the downwardly moving crushing bars 38 to a set of crushing rollers 40 which rotate in engagement with one another to comminute the debris discharged from the crusher bars 38. Both the crusher bars 38 and the rollers 40 are surrounded and enclosed by a casing 41 which is itself joined and sealed to the collection bin 17 to prevent dust, gases or debris resulting from the crushing process from entering the ambient atmosphere. As noted above, the door 18 of the bin 17 is closed during the crushing operation and is essentially sealed to the entrance opening in the bin 17 to prevent discharge of gas, etc. through the door. In addition, as explained further below, a negative air pressure draw is imposed on both the crusher 32 and the collection bin 17 to draw air and gases away from these components. A one-way air inlet valve 42 is mounted to one side of the collection bin 17 to admit air into the bin 17 to make up for the air that is drawn from the bin and to ensure a positive flow of air from the bin through the crusher 32. The air inlet 42 may have a one-way valve (e.g., a butterfly or flap valve, etc. fitted with a sensor to monitor air flow into the enclosure) to ensure that substantially no gases from the bin 17 which are released from the fluorescent lamps as they are crushed is released to the outside atmosphere. As noted above, the door 16 of the truck enclosure 15 is also preferably closed during crushing. Consequently, the interior of the truck enclosure also is at a somewhat negative air pressure, with outside makeup air being drawn into the truck enclosure primarily through the joints between the door 16 and the adjoining door frame of the enclosure 15. As used herein, the term "air" is intended to refer to the normal atmospheric gases and also mercury vapor and other gases released from the crushed lamps which are mixed with atmospheric air gases.

The debris which is passed from the crushing rollers 40 drops to the bottom 44 of the casing 41 where it is engaged by a screw auger 46 encased in a tube 47 which forms a first material conveyor 48. The tube 47 is joined to the casing 41 to form an air-tight seal. The conveyor 48 receives the crushed glass, metal end caps and filaments, and any phosphor powders released from the crushed glass, and conveys this material to a second conveyor 50. The conveyor 50 also preferably is constructed to have a screw auger 51 rotating within a tube 53. The tube 53 is joined to the tube 47 to form an air-tight seal. The auger 51 is driven in rotation within the tube 53 by a motor 54 connected by a belt to a wheel 55 which is mounted to the central shaft of the auger 51 to turn it at a relatively slow rotational speed. The conveyor 50 conveys the debris upwardly to the top of the separator 34 and drops the debris, comprising a mix of crushed glass, metal, and powder, into a tube 56 defining an inlet opening in an enclosure of the separator 34. In the process of conveying the debris, the action of the auger 51 also helps grind the debris and to agitate it to free the phosphor dust from adherence to the glass particulates. The separator 34 separates the dust from the particulate matter, the latter being discharged through a particulates discharge port or opening 60 from the separator 34 into the discharge conveyor 35, which may also be of the auger type, having a central auger 62 driven by a motor 63, with the auger rotating within a tube 64.

The separator 34 has walls 65 defining a separator enclosure and has a dust exhaust opening or port 66, covered by a coarse screen 67, to which an outlet conduit section 68 is connected. A second fine screen 69 is mounted in the outlet conduit 68. The cross-sectional area of the outlet conduit section 68 preferably increases as it extends away from the dust exhaust opening, with a commensurate decrease in the rate of air flow, allowing larger glass particles to fall out of air entrainment in the conduit section 68. Conduit tubes 70 extend from the outlet conduit 68 to a dust filter unit 72 which preferably is of the bag-house type (e.g., Snyder General AR-10), having a sealed housing 73 enclosing an interior which is divided by a folded bag-house filter 74 into an inlet section 75 and an outlet section 76. Air and dust from the conduits 70 enter the inlet section 75 and the air passes through the folded bag-type filters 74 under a negative air pressure draw. The dust filter 72 may be formed in a conventional fashion with commercial components, with the primary function of the dust filter being to separate substantially all of the solid dust from the air and other gases. The folded bag-house filter 74 is periodically shaken by action of a shaker motor (not shown) to shake the dust off the filter 74, which then falls by gravity through a chute 78 to the waste receptacle 21. Air from the outlet section 76 of the dust filter 72 is drawn through a conduit 80 to a microfilter unit 81 which filters out very fine particulate matter, and the air is then drawn into a charcoal vapor filter 84 for absorption of potentially toxic vapors, such as mercury, etc. The air is drawn from the charcoal filter 84, and thus through the conduits leading to the charcoal filter, by a motor driven blower 85 which exhausts the air through a conduit 86 to the atmosphere outside the vehicle enclosure 15. The filter unit 81 may use pleated paper filters and prefilters 88 of conventional design (e.g., high efficiency particle HEPA filter material such as Hoover 43611017). Suitable charcoal vapor filters include Calgon Ventsorb, charged with HGR carbon, and Barnaby-Sutcliff CB-1 and CB-2.

To maintain adequate circulation through the dust filter 72 and a proper negative air pressure on the system, a circulating air flow path is provided between the dust filter 72 and the separator 34 which is in addition to the intake and exhaust air flow path as described above. This separate air flow path from the dust filter 72 is driven by an electric motor operated blower 90 which draws air which has been passed through the filters 74 and provides the air on a conduit 91 to the bottom end of the conveyor 50. The air from the conduit 91 passes into the conveyor 50 in the same direction and in addition to the air flow from the conveyor 47. Preferably, a conduit 93 is joined to the tube 53 of the conveyor 50 at a position above that at which the conveyor 47 intersects the conveyor 50. The conduit 93 is preferably sized to provide about the same volumetric flow as the conduit 91, e.g., 100 cubic feet per minute (CFM), from the position at which it joins the conveyor 50 to an exit port 94 at which it enters the separator 34. In addition, a conduit 96 opens into the collection bin 17 at a position near the discharge edge 27 of the collection bin and provides for transfer of air and vapor to an exit 94 at the separator 34 where the air flow passing from the conduit 96 joins the air flow passing from the conduit 93. The air drawn through the conduit 96 may be about the same volume of air drawn in from the outside air port 42 (e.g., 100 CFM) plus make-up for any leaks of air into the system. The air from the two conduits 93 and 96 passes through the separator and is drawn through the conduits 70 to the dust filter 72.

Where it is desired to attempt to remove as much mercury as possible from the glass particulate matter before it is discharged to the first receptacle 20, a heating operation can be performed on the particulates in the discharge conveyor 35. As illustrated in FIG. 2, the discharge conveyor 35 transfers particulate by the action of the auger 62 to the discharge chute 36. A heater 100, e.g., a propane gas fired sealed combustion heater 101 supplied with gas and combustion air from a source (not shown in FIG. 2) through a pipe 102, provides heated air to a conduit 103 joined to the tube 64 of the conveyor 35 at a position near its discharge end. Air passes from the conduit 103 through the conveyor 35 and out through an exit conduit 105 which is joined to the conveyor 35 at a position spaced away from the exit opening 60 from the separator 34. The air in the conduit 105 is drawn through a charcoal vapor filter 106 by the action of a blower and motor unit 107, which forces the air drawn through the charcoal filter to a conduit 109 leading to the heater 100. Thus, a closed circuit of air passes through the conduit 35 and the charcoal filter 106. The heated air from the heater 100, as it passes through the conveyor 35, heats the glass and metal particulate to drive off residual mercury absorbed in or adsorbed on the particles, with this vapor then being trapped and absorbed by the charcoal in the charcoal filter 106. If desired, the air passing into the charcoal filter 106 from the line 105 may be cooled by a radiator (not shown in FIG. 2) to aid the efficiency of absorption of the vapors by the charcoal in the charcoal filter 106. A vent port 108 may be provided to vent a controlled amount of air to the atmosphere (e.g., 10 CFM) after the air has been filtered by the charcoal filter 106.

Figure 3:
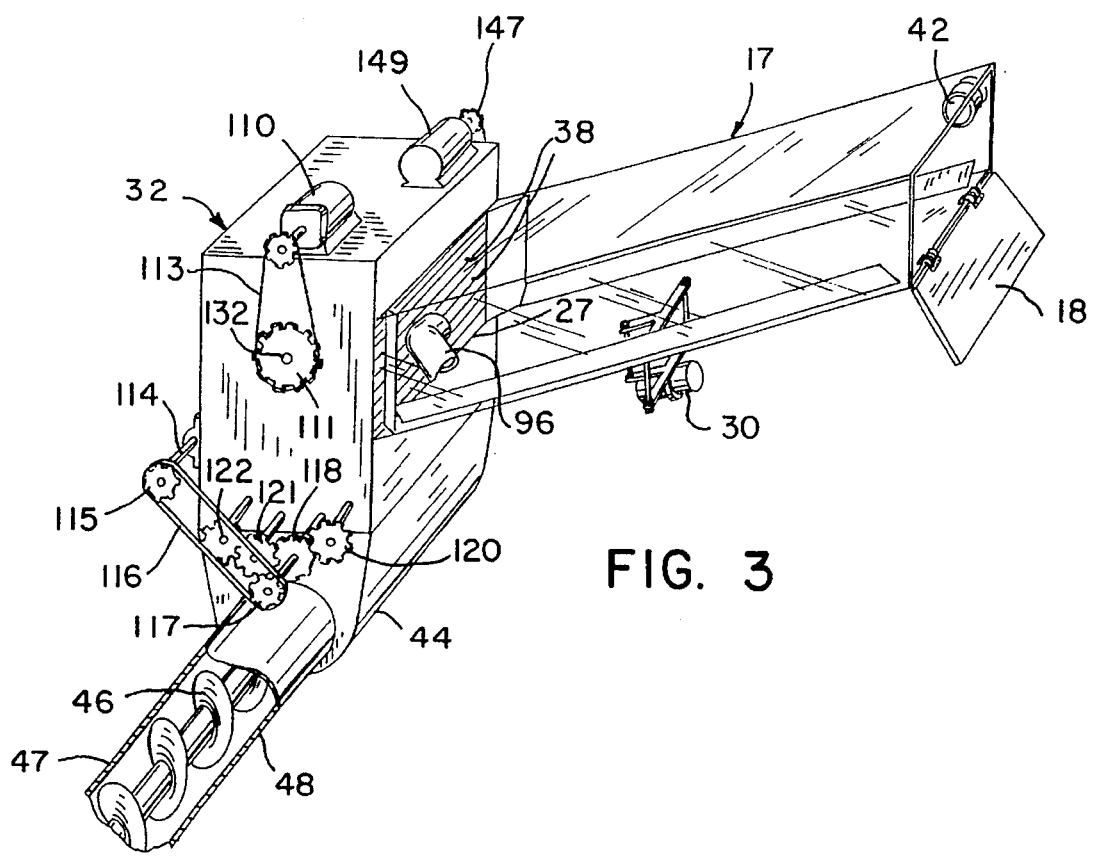
FIG. 3 is a further perspective view of the collection bin and crusher portion of the apparatus of the invention.
Figure 4:
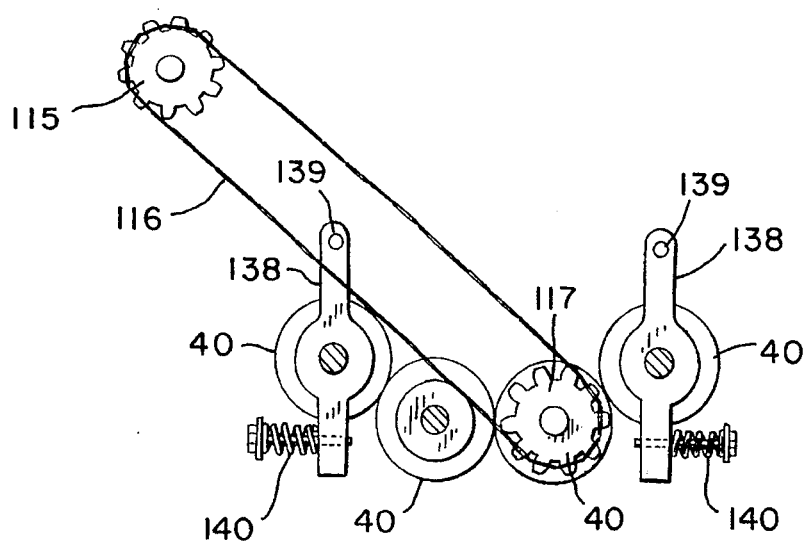
FIG. 4 is a side view of the crusher roller drive assembly for the crusher of FIG. 3.
Figure 5:
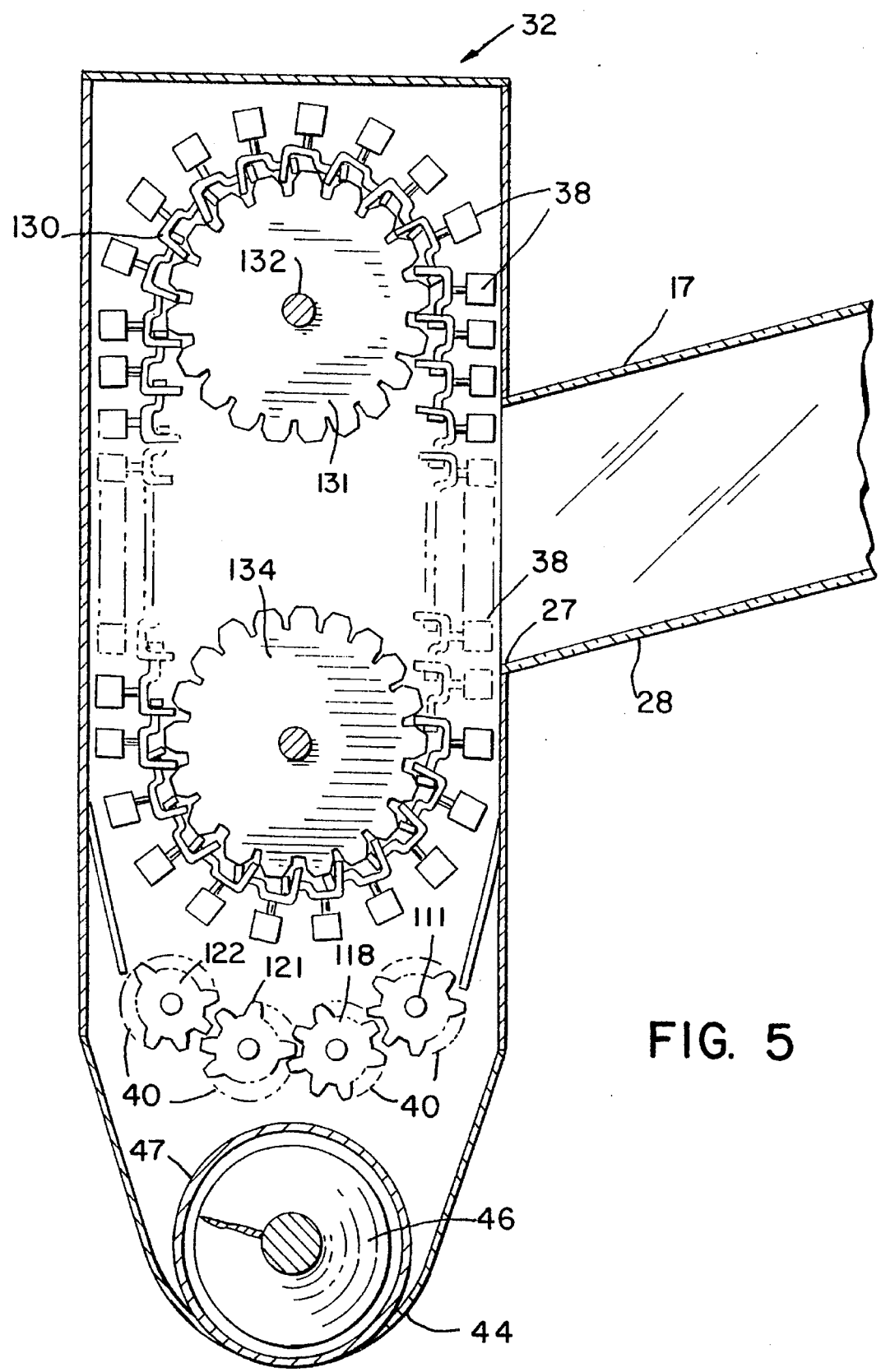
FIG. 5 is a view partially in cross-section, of the crusher taken generally along the lines 5—5 of FIG. 3.

An external view of the crusher 32 is shown in FIG. 3, illustrating the drive for the crusher bars 38 and the crusher rollers 40. Power to drive the crusher bars 38, which are mounted at their ends to chains (not shown in FIG. 3) is provided from a motor 110 driving a sprocket 111 by a chain 113. The sprocket 111 is connected via a drive shaft 132 to a gear wheel 131, (shown in FIG. 5) within the housing 41, which is engaged to the chains 130 on which the crusher bars 38 are mounted. Power is provided from a shaft 114 to an end sprocket 115 and via a chain 116 to a sprocket 117 connected to a main drive gear 118 to which driven gears 120, 121 and 122 are engaged. The gears 118, 120, 121 and 122 are in turn mounted on shafts which are engaged to the crusher rollers 40. As will be apparent from FIG. 3, when the main gear 118 is driven in clockwise rotation (as is the crusher roller to which it is connected), the gear 120 will be driven in counterclockwise rotation, the gear 121 in counterclockwise rotation and the gear 122 in clockwise rotation, so that the crusher rollers 40 connected to the gears 118 and 120 will rotate to draw particles between them for crushing, as will the rollers 40 attached to the gears 121 and 122, as illustrated in FIG. 4. This action is also illustrated in FIG. 5, which shows one of the chains 130 on which the crusher bars 38 are mounted, with the chain 130 being connected to a drive gear wheel 131 which is driven by a shaft 132 connected to the gear wheel 111, the chain 130 also being supported by an idler gear 134 at the bottom portions of the chain 130. It is understood that similar gear wheels 132 and 134 are mounted on the opposite end of the crusher to support a chain 130 at the opposite ends of the crusher bars 38. As illustrated in FIG. 2, the crusher rollers 40 preferably have raised "land" regions formed therein which are fitted to engage into the valleys between the land areas on the adjacent roller to enhance the comminuting action of the rollers on the crushed glass and other matter passed to the rollers from the crusher bars.

As illustrated in FIG. 4, which is a partial view of the ends of the rollers 40, the outermost rollers 40 are mounted on a swinging bar 138 mounted to a pivot 139 which is itself mounted to a wall of the casing 41 for the crusher. Springs 140 urge the rollers 40 into tight engagement with each other.

Figure 6:
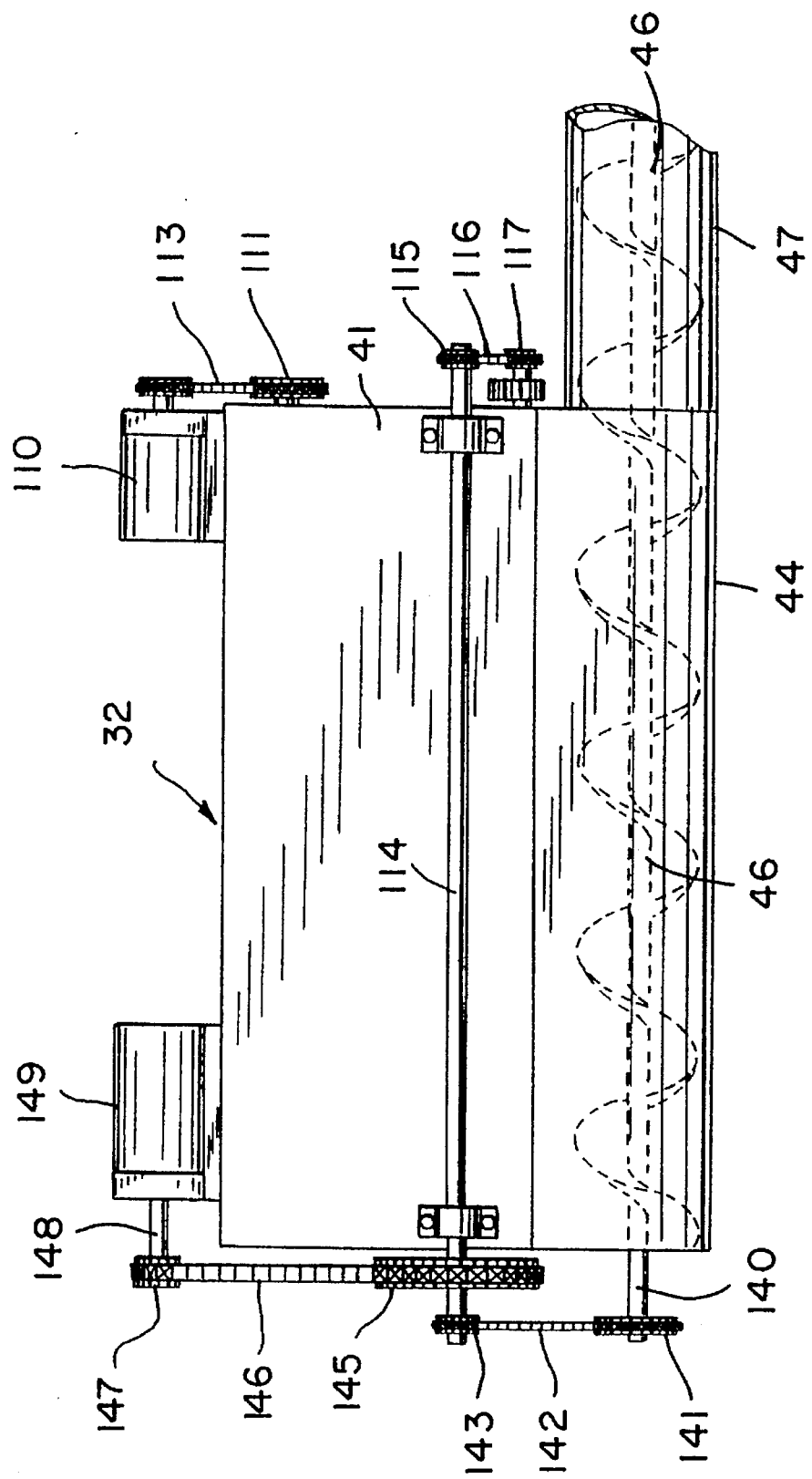
FIG. 6 is a back elevation view of the crusher.

As further illustrated with respect to FIGS. 3 and 6, the auger 46 is driven off a shaft 140 connected by a sprocket 141, a chain 142, and another sprocket 143 to the drive shaft 114. The shaft 114 in turn is driven off a sprocket 145 connected by a chain 148 to a sprocket 147 driven off the shaft 148 of a motor 149. The auger 46 is illustrated in dashed lines in FIG. 6 to show that the auger extends through the entire bottom section 44 of the crusher to convey the crushed material out of the crusher and into the conveyor section 47.

Figure 7:
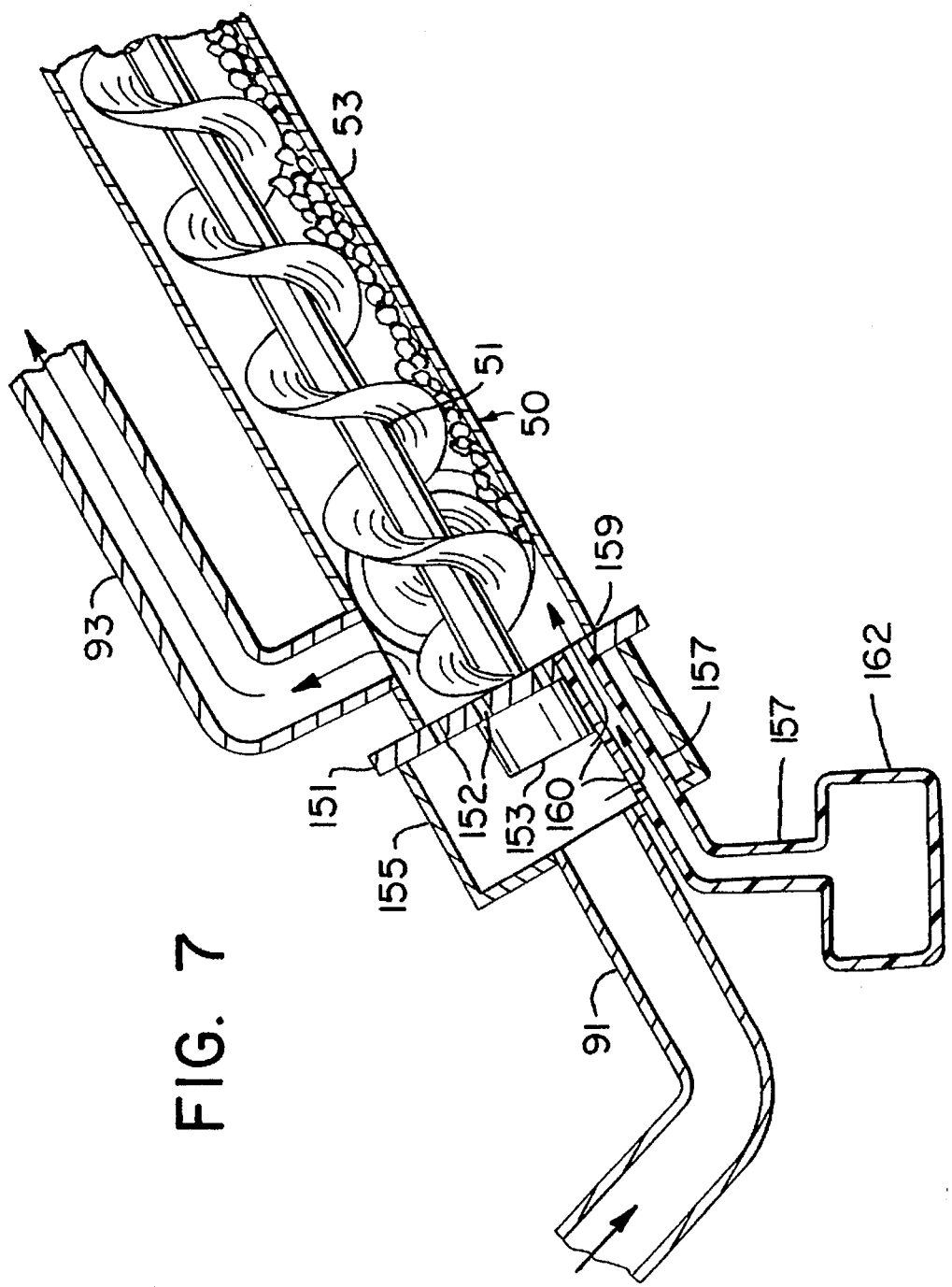
FIG. 7 is a partial cut-away view of an auger conveyor of the apparatus of FIG. 2.

FIG. 7 shows a partially broken away view of the bottom section of the conveyor 50. Mounted to the bottom of the conveyor 50 is an end plate 151 which has openings or ports 152 therein to allow passage of the air from the conduit 91 into the tube 53 of the conveyor 50. The end plate 151 also has a bearing 153 mounted to it to which the shaft of the auger 51 is mounted for rotation. A housing 155 is mounted to the end plate 151 and sealed thereto, and it is also engaged and sealed to the end of the conduit 91. Thus, air from the conduit 91 flows into the enclosure defined by the housing 155 before passing through the ports 152. In addition, a tube 157 is mounted to the housing 155 and extends therethrough to open up into the bottom of the conveyor 50 at the position at which the bottom end 159 of the tube 53 meets the end plate 151. The tube 157 also has openings 160 at the top of the tube 157 to allow air to flow therethrough from the conduit 91. The tube is connected at its bottom end to a reservoir receptacle 162. The purpose of the tube 157 and the reservoir 162 is to collect liquid mercury or other liquids which are released from the debris in the upwardly extending conveyor 50, inasmuch as this liquid will flow down to the juncture 159 of the conveyor tube 153 as the solid particulates are being driven upwardly by the action of the auger 51. The small amounts of liquid mercury that would otherwise be entrapped with the solid particulates can thus be separated from the solids in this manner.

Figure 8:
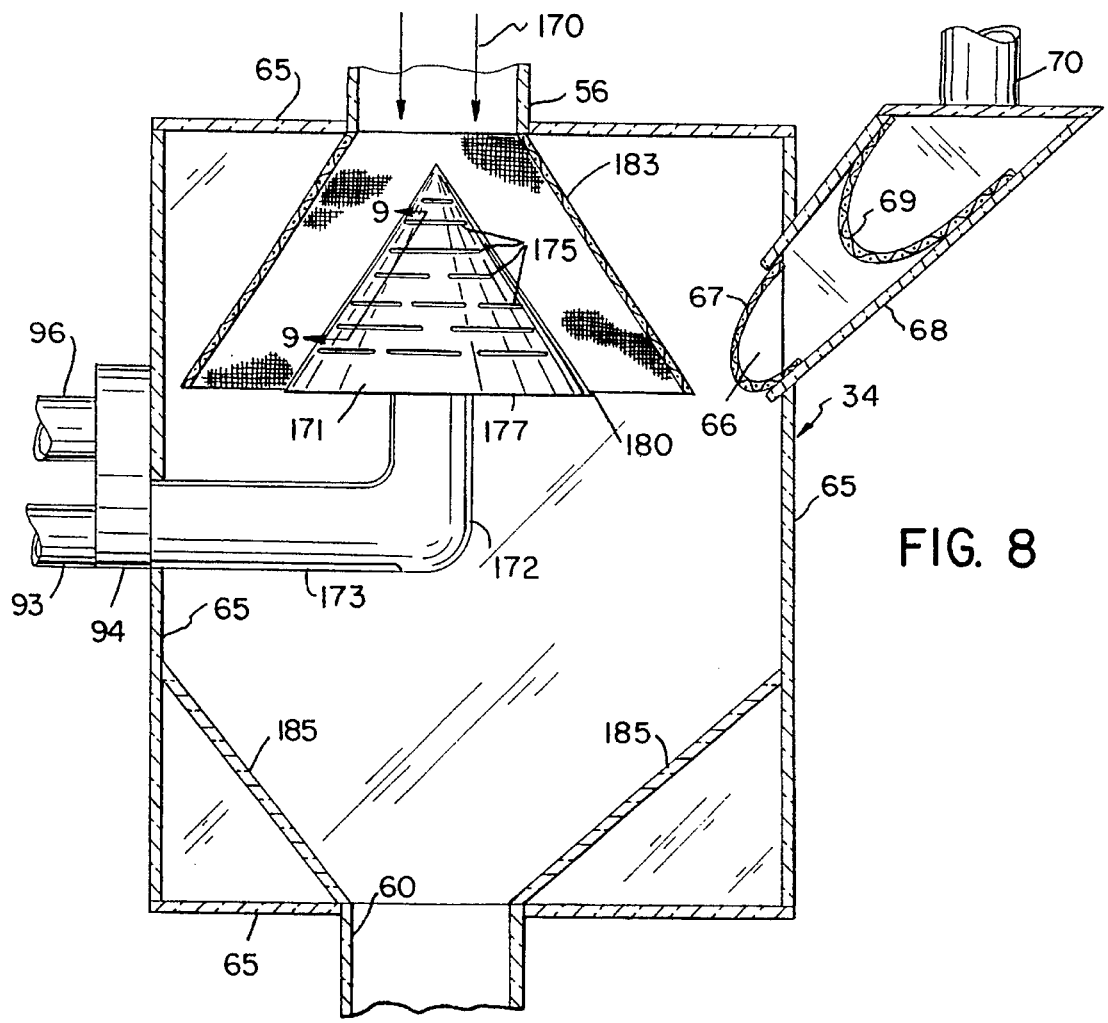
FIG. 8 is a view, partially in cross-section, of the glass and dust separator of the apparatus of FIG. 2.

A more detailed view of the separator 34 is shown in FIG. 8. The particulate matter discharged from the conveyor 50 through the inlet opening tube 56, illustrated by the arrows 170, falls downwardly under the force of gravity onto the top of a conical deflector 171. The conical deflector 171 is mounted on a pipe 172 which is connected to and in communication with the conduits 93 and 96. The pipe 172 is mounted to a wall 65 of the enclosure of the separator 34 for mechanical support. The pipe 172 provides physical support for the conical deflector 171 and also provides supply of air flow from the conduits 93 and 96 to the hollow interior of the deflector 171. A cleanout slit 173 is preferably provided in the bottom of the pipe 172 to allow selective access to the interior of the pipe to allow cleaning if desired. It is understood that closable access ports may be provided at various places in the conduits, conveyors and other components of the system to allow cleaning of these components when necessary.

Figure 9:
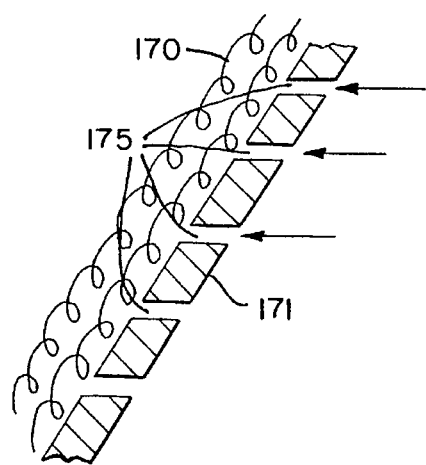
FIG. 9 is a partial cross-sectional view of the conical deflector, taken along the lines 9—9 of FIG. 8, illustrating the air discharge slots in the conical deflector.

A plurality of narrow openings or ports 175 are formed about the surface of the conical deflector 171. For example, the ports 175 may be formed as narrow slits cut into the conical surface of the deflector 171, with a plurality of slits each being cut into the deflector at the same level of the deflector at spaced levels between its bottom 177 and its apex 178. Thus, air flowing from the conduits 93 and 96 into the interior of the conical deflector 171 will exit from the ports 175 in substantially horizontal jets, as illustrated in FIG. 9. The air passing through the ports 175 will exit through the exhaust opening 66 in the separator. As the solid matter in the stream 170 falls onto the conical deflector 171 and passes down the conical surface of the deflector, the heavier solid particulates continue to fall by the influence of gravity until they pass the bottom edge 180 of the conical deflector 171. The lighter dust is blown outwardly from the solid particulates by the action of the jets of air passing through the ports 175, and the dust is mixed with the ambient air in the space around the cone 171. This dust laden air is drawn outwardly through the exhaust opening 66 in the separator 34, with larger particles being prevented by the course screen 67 and the finer screen 69 from passing through the outlet housing 68 to the outlet conduits 70. Additionally, a conical coarse screen 183 is preferably mounted about the conical deflector 171, and is spaced away from the surface of the conical deflector as illustrated in FIG. 8, so that larger solid particles are prevented from passing outwardly through the screen 183 while the smaller dust particles can readily pass through the screen 183 and be drawn outwardly through the exhaust opening 66. The coarse particles continue falling downwardly and strike a funnel 185 at the bottom of the separator 34 which guides the solid particles to the particulates discharge port 60 and thence by gravity into the conveyor 35.

An alternative heating apparatus for use in conjunction with the outlet conveyor 35 is illustrated in FIG. 10. In the structure of FIG. 10, the outer tube 64 has a series of holes 187 formed in the top thereof and a series of holes 188 formed in the bottom, as illustrated in the top and bottom views of FIGS. 12 and 13. A screen 190 formed of a fine metal mesh is mounted outside the tube 64 over the holes 187 and 188 as illustrated in FIG. 10 and in the cross-sectional view of FIG. 11. A heater 193, which may be a gas heater similar to the heater 100, is connected to provide heated air through a conduit 194 to a plenum 192 which is in communication with the holes 187. The heated air passes through the screen 190 to heat the particulate matter being conveyed by the auger 62 and thereby release mercury or other contaminants from the debris. The air flow through the tube 64, which is provided from the inlet tube 194, is drawn out through the holes 188 and through an outlet plenum 195 to an outlet tube 196 and thence to a chiller 197, preferably having adjustable temperature control, and then through a conduit 198 to a charcoal filter 199. The chiller 197 chills the air in the conduit 198 to improve the efficiency of the charcoal filter 199. After passing through the charcoal filter 199, which traps the evaporated mercury and other similar vapors, the circulating air is passed on a conduit 200 to an enclosed blower 201 and thence on a conduit 202 back to the heater 193. The air flowing from the blower 201 has been substantially cleansed by the charcoal filter 199, and a portion of the air exiting from the blower may be diverted on a conduit 204 through a diverter control valve 205 (or simply an orifice) to a vent 206 leading to the outside atmosphere. For example, if the blower 201 provides 100 CFM air flow through it, the diverter 205 may allow 10 CFM to be passed through the vent 206. The air which is diverted through the vent 206 is made up either by air entering into the input port 60 or by air drawn in from the outside through the output discharge chute 36 which is admitted through the joints between the chute and the first receptacle 20. The screen 190 about the auger allows heated air flow to pass over and through substantially all of the crushed debris being conveyed by the auger 62 to thoroughly heat the debris and allow full evolution of the vapors released from the heated material.

By utilizing the apparatus of the present invention, the solid particulate matter which is discharged into the first receptacle 20 is substantially cleansed of any toxic material such as mercury or phosphor dust, typically with at least 95% of the mercury and toxic dust by weight in the original lamps having been cleansed from the solid particulate in the receptacle 20. Thus, this material is not considered hazardous and may be disposed of in landfills in a conventional manner. The potentially hazardous material, such as the mercury and phosphor dust, are separated from the solid particulates with high efficiency and are provided in a final form in the second receptacle 21 which is vastly reduced in volume from the potentially contaminated unbroken lamps 11. Typically, the dust collected in the second receptacle 21 will have a volume and weight which is a tiny fraction of the volume and weight of the original fluorescent lamps 11, e.g., less than one one-hundredth and generally less than one one-thousandth of the volume and weight of the original material. If the collection process is efficient, very little nontoxic debris which would unnecessarily increase the bulk and weight of the separated material in the receptacle 21 is actually deposited in this receptacle, thereby minimizing the hazardous waste which must be stored and/or transported and disposed of. The mercury vapor is filtered out of the ambient air by the charcoal filters 84 and 106 (or the charcoal filter 199 in the alternative final heater structure of FIG. 9), and is retained in the charcoal of the filters until it is necessary to replace the charcoal of these filters. Generally, the charcoal filters are capable of absorbing the mercury vapor released from many millions of fluorescent tubes, so that replacement of the charcoal filters is only required at long intervals. A small amount of liquid mercury and other liquid debris is collected in the container 162 and may be separately disposed of or recycled as appropriate.

The control of the operation of the various blower and shaker motors may be carried out with electromechanical relays or computer controls of conventional design. Generally, all motors are running when the apparatus is in operation. However, it is preferred that the crusher 32 and the various conveyors not be operating when the bin door 18 is opened but that the main blower 85 continue operating to draw air through the system and minimize leakage of vapors to the atmosphere through the opened bin 17. It is also preferred that the conveyors start operating before the crusher 32 and stop operating after the crusher stops to minimize buildup of debris in the bottom 44 of the crusher. The electrical power to run the motors may be provided from a generator driven by the engine of the vehicle 13, by a separate gasoline or propane engine driven generator, or by an electrical hookup to AC line power at the facility.

Although the invention has been described with reference to the processing of fluorescent lamps, it is understood that the invention may be used with other types of lamps which contain potentially hazardous material, e.g., mercury vapor lamps. It is thus understood that in the foregoing description and in the following claims, reference to fluorescent lamps is exemplary only and is intended to refer to any type of lamp with which the invention may be utilized.

Auger type conveyors as discussed above (e.g., as available from Feed-O-Matic, etc.) help break down and loosen the particulate debris, but it is understood that they are exemplary only, and other types of solids conveyors, such as endless belt conveyors, may be utilized. The conveyors and conduits are sealed to each other and to other components as described above so that the lamp debris is sealed from the atmosphere until processing is completed.

It is also understood that the invention is not confined to the particular embodiments set forth herein as illustrative, but embraces all such modified forms thereof as come within the scope of the following claims.

What is claimed is:

1. Mobile lamp collection and separation apparatus comprising:

a wheeled mobile vehicle transportable to a facility site where lamps to be processed are located;

separation apparatus mounted to the mobile vehicle, the separation apparatus comprising:

(a) a collection bin having an interior and a door mounted to open to allow lamps to be placed in the interior of the collection bin and to be closed to seal the interior of the collection bin, the bin having a discharge end;

(b) crusher means, mounted to receive tubes discharged from the discharge end of the collection bin, for crushing the tubes to particulates of glass and metal and dust mixed therewith;

(c) separator means receiving mixtures of crushed glass, metal particulates and powder and separating the particulates and discharging them to a particulates discharge port and discharging the dust carried by air to a dust exhaust discharge port;

(d) conveyor means for conveying the mixtures of crushed glass, metal and dust from the crusher means to the separator means;

(e) a dust filter for filtering dust from air; and (f) a conduit for conducting the dust carried by air from the dust exhaust port of the separator means to the dust filter, the dust filter collecting the solid dust and having a discharge port from which the collected dust may be discharged.

2. The apparatus of claim 1 further including a charcoal vapor filter having an inlet and an outlet, the charcoal filter trapping toxic vapors such as mercury from the gas passed therethrough, a conduit connecting the inlet of the charcoal filter to the dust filter to direct air passed through the dust filter to the charcoal filter, and a blower connected to the outlet of the charcoal filter to draw air through the charcoal filter from the dust filter.

3. The apparatus of claim 2 wherein the collection bin has an air inlet port to allow air to flow into the interior of the bin from the outside atmosphere but not allow air to flow out of the bin to the atmosphere, at least a portion of the air exhausted from the blower to the atmosphere being made up by air admitted through the air inlet port into the collection bin from the outside atmosphere.

4. The apparatus of claim 3 wherein the collection bin, crusher means, separator means, conveyor means, dust filter, charcoal filter, and the conduits connecting the separator means to the dust filter and the dust filter to the charcoal filter are sealed from the outside atmosphere so that vapors produced by the crushing of the lamps is not discharged into the atmosphere except after passing through the charcoal filter.

5. The apparatus of claim 4 including a vehicle enclosure mounted on the mobile vehicle, the enclosure having a door which can be opened and closed, the enclosure mounted around the separation apparatus to enclose it when the door of the enclosure is closed, thereby to allow the separation apparatus to be substantially closed off from the atmosphere outside the vehicle enclosure during operation of the separation apparatus.

6. The apparatus of claim 5 including means for discharging the particulate matter from the separation means to a first receptacle outside the vehicle enclosure and means for discharging the dust collected by the dust filter to a second receptacle outside the vehicle enclosure.

7. The apparatus of claim 1 wherein the crusher means includes parallel crusher bars having ends which are mounted to chains, the chains mounted to sprocket wheels and a motor operatively connected to the sprocket wheels to selectively drive the chains and the parallel crusher bars to move the bars in downward motion across the discharge end of the collection bin to engage and break tubes being discharged from the discharge end of the collection bin, and further including crush rollers mounted for rotation beneath the parallel crusher bars and driven by a motor to rotate in engagement with one another to receive crushed debris from the crusher bars and further comminute the debris.

8. The apparatus of claim 7 wherein the conveyor means includes a screw auger mounted beneath the crush rollers to receive material comminuted by the crush rollers and to convey the material away from the crusher means.

9. The apparatus of claim 8 wherein the conveyor means further includes a second screw auger mounted to receive material from the screw auger mounted beneath the crush rollers and to convey the material to the separator means, the second screw auger enclosed in a tube such that the screw auger engages the crushed material between the auger and the tube to convey the same and further grind and separate the material as it is being conveyed.

10. The apparatus of claim 1 wherein the separator means has a separator enclosure with a dust exhaust opening to which an outlet conduct section is connected, at least one screen mounted in the outlet conduit section, the cross-sectional area of the outlet conduit section increasing as it extends away from the dust exhaust opening with a commensurate decrease in the rate of air flow, thereby allowing larger glass particles to fall out of air entrainment as the air passes through the outlet conduit section.

11. The apparatus of claim 1 wherein the separator means comprises walls defining a separator enclosure having a top with an inlet opening at which crushed glass, metal and dust debris from the lamps is discharged from the conveyor means, a conical deflector with a hollow interior mounted beneath the inlet opening, the conical deflector having air outlet ports formed therein over its surface, and a conduit extending from a separator enclosure wall to the conical deflector and having an interior which is in communication with a hollow interior of the conical deflector, the conduit supporting the conical deflector, and further including a conduit connected to the conduit supporting the conical deflector supplied with air flow such that air is driven out of the ports in the conical deflector as jets to blow the dust in the mixture of debris striking the conical deflector away from the particulate matter, and an exhaust outlet in the separator enclosure having the conduit connected thereto from which air carrying dust is withdrawn from the separator means and directed to the dust filter such that dust entrained in the air flowing from the conical deflector is drawn out through the exhaust outlet in the separator enclosure, the separator enclosure further having a solid particulate outlet opening at its bottom beneath the conical deflector, the particulate outlet opening discharging solid particulate matter therefrom.

12. The apparatus of claim 11 wherein the conduit supporting the conical deflector is connected by a conduit to receive air drawn from the interior of the collection bin.

13. The apparatus of claim 12 wherein the conveyor means includes an auger conveyor having an outer tube, an auger mounted for rotation within the tube, and a motor driving the auger, the auger conveyor having a bottom end at which it receives crushed material from the crusher means and a top end which is connected to the inlet opening of the separator enclosure to discharge debris to the separator means, and further including a conduit extending from the conduit supporting the conical deflector to a position near a bottom end of the conveyor tube to provide air flow from the bottom of the conveyor tube through the conduit to the interior of the conical deflector, and further including a conduit connected to the air outlet of the dust filter to provide air flow from the air outlet of the dust filter to the bottom end of the conveyor tube, and a blower connected to draw air from the air outlet of the dust filter and into the conduit connected to the bottom end of the conveyor tube, such that a circulating air flow is formed from the outlet of the dust filter through the conduit to the bottom of the conveyor tube and from the conduit connected to the bottom of the conveyor tube to the separator enclosure through the conical deflector and out the exhaust outlet of the separator enclosure and therefrom through the conduit connected from the exhaust outlet to the inlet of the dust filter.

14. The apparatus of claim 1 further including a discharge conveyor connected to receive the particulate matter discharged from the separator means at an inlet end, the discharge conveyor including an outer tube and an auger mounted to rotate within the tube and driven by a motor to drive particulate matter received from the separator means to an outlet end of the discharge conveyor, a heater mounted to heat air supplied thereto and connected to supply the heated air to the tube of the discharge conveyor at a position near the outlet end, a conduit connected to the tube of the discharge conveyor near the inlet end of the discharge conveyor to receive air from the discharge conveyor and supply the air to an inlet side of a charcoal filter, a blower mounted to an outlet side of the charcoal filter to draw air from the filter which is passed through charcoal within the filter, the blower connected to a conduit which is connected to supply the air from the blower to the heater such that a circulating air flow is provided from the discharge conveyor through the charcoal filter and the heater so that the particulate matter in the discharge conveyor is heated, thereby to drive off vapors of hazardous material which are filtered out by the charcoal filter.

15. The apparatus of claim 1 wherein the dust filter comprises a bag-house filter having an outer enclosure, the enclosure having an interior, the interior divided by filter bags into an inlet side and an outlet side, the inlet side connected to receive the dust and air from the separator means, a conduit connected to the bag house filter to convey air drawn from the outlet side of the bag house filter to the inlet side of a charcoal filter, and a blower connected to an outlet side of the charcoal filter for drawing the air therethrough and a conduit connected to the blower to discharge the air passed through the charcoal filter to the atmosphere.

16. The apparatus of claim 15 further including a fine dust filter including filter paper mounted in the conduit between the bag house filter and the charcoal filter.

17. The apparatus of claim 1 wherein the collection bin is mounted to decline from its opening to its discharge end and having a flat bottom panel, and a shaker mounted to the flat bottom panel which is selectively operative to vibrate the bottom panel to move lamps resting on the bottom panel toward the discharge end of the collection bin by the shaking of the bottom panel.

18. The apparatus of claim 1 further including a discharge conveyor extending from an inlet position receiving particulate matter discharged from the separator means to an outlet position at which particulate matter is discharged from the apparatus, an auger mounted and selectively driven for rotation, an outer tube surrounding the auger, at least a portion of the outer tube spaced away from the auger, a cylindrical screen mounted about the auger at the portion of the conveyor at which the outer tube is spaced away from the auger, and a circulating air flow path comprising a conduit extending from connection to the outer tube to a chiller and thence to a charcoal filter and thence to a blower which draws air through the chiller and charcoal filter and thence in a circulating path to a heater and from the heater to convection to the tube of the conveyor to provide flow of hot air through the auger and the particulate matter being conveyed by the auger supported by the cylindrical screen thereby to drive off vapors of potentially hazardous material which are filtered out in the charcoal filter.

19. The apparatus of claim 1 wherein the vehicle comprises a truck having a wheeled truck body and a truck enclosure mounted to the truck body to surround the separation apparatus, and a door on the truck enclosure to selectively allow access to the separation apparatus.

20. The apparatus of claim 19 including an air inlet through which air is drawn into the separation apparatus and an air exhaust from which air is exhausted through the truck enclosure from the separation apparatus, with the separation apparatus being maintained at a negative air pressure with respect to the ambient atmosphere.

21. A method of processing fluorescent lamps comprising the steps of:

(a) transporting separation apparatus on a wheeled vehicle to a facility site at which lamps are used and are collected for processing;

(b) at the facility site, crushing the fluorescent lamps in the separation apparatus on the wheeled vehicle and separating the crushed lamps into solid particulate matter which is substantially free of phosphor dust and other hazardous material and discharging such particulate matter into a first receptacle and separating the potentially hazardous dust material and discharging the dust material into a second receptacle, and trapping mercury and other vapors from the lamps as they are crushed in a filter in the separation apparatus mounted to the vehicle;

(c) disposing of material in the first receptacle containing the solid particulate matter as normal solid waste and disposing of material in the second receptacle containing the potentially hazardous dust material in accordance with environmental regulations.

22. The method of claim 21 further including the step of retaining the first and second receptacles at the facility site and transporting the wheeled vehicle to another site at which fluorescent lamps are used and collected for processing.

23. The method of claim 21 wherein the separating apparatus on the vehicle is enclosed in an enclosure in the vehicle from the outside atmosphere, and including the steps of drawing outside air into the separation apparatus enclosed on the vehicle as the lamps are being crushed to mix mercury vapors from the crushed lamps in the air drawn into the separation apparatus and drawing the air with the mercury vapor in it through a charcoal filter to filter out the mercury vapor and then exhausting the filtered air to the atmosphere outside the vehicle enclosure.

24. Fluorescent lamp crushing and separation apparatus comprising:

(a) a collection bin having an interior and a door mounted to open to allow lamps to be placed in the interior of the collection bin and to be closed to seal the interior of the collection bin, the bin having a discharge end;

(b) a crusher mounted to receive tubes discharged from the discharge end of the collection bin to crush the tubes to particulates of glass and metal and dust mixed therewith, the crusher comprising parallel crusher bars having ends which are mounted to chains, the chains mounted to sprocket wheels and a motor operatively connected to the sprocket wheels to selectively drive the chains and the parallel crusher bars to move the bars in downward motion across the discharge end of the collection bin to engage and break tubes being discharged from the discharge end of the collection bin, and further including crush rollers mounted for rotation beneath the parallel crusher bars and driven by a motor to rotate in engagement with one another to receive crushed debris from the crusher bars and further comminute the debris;

(c) separator means receiving mixtures of crushed glass, metal particulates and powder and separating the particulates and discharging them to a particulates discharge port and discharging the dust carried by air to a dust exhaust discharge port;

(d) conveyor means for conveying the mixtures of crushed glass, metal and dust from the crusher means to the separator means;

(e) a dust filter for filtering dust from air; and (f) a conduit for conducting the dust carried by air from the dust exhaust port of the separator means to the dust filter, the dust filter collecting the solid dust and having a discharge port from which the collected dust may be discharged.

25. The apparatus of claim 24 wherein the conveyor means includes a screw auger mounted beneath the crush rollers to receive material comminuted by the crush rollers and to convey the material away from the crusher means.

26. The apparatus of claim 25 wherein the conveyor means further includes a second screw auger mounted to receive material from the screw auger mounted beneath the crush rollers and to convey the material to the separator means, the second screw auger enclosed in a tube such that the screw auger engages the crushed material between the auger and the tube to convey the same and further grind and separate the material as it is being conveyed.

27. Fluorescent lamp crushing and separation apparatus comprising:

(a) a collection bin having an interior and a door mounted to open to allow lamps to be placed in the interior of the collection bin and to be closed to seal the interior of the collection bin, the bin having a discharge end;

(b) crusher means, mounted to receive tubes discharged from the discharge end of the collection bin, for crushing the tubes to particulates of glass and metal and dust mixed therewith;

(c) separator means receiving mixtures of crushed glass, metal particulates and powder and separating the particulates and discharging them to a particulates discharge port and discharging the dust carried by air to a dust exhaust discharge port;

(d) a screw auger conveyor mounted beneath the crusher means to receive material comminuted by the crush means and to convey the material away from the crusher means, a second screw auger conveyor mounted to receive material from the screw auger mounted beneath the crusher means and to convey the material to the separator means, the second screw auger enclosed in a tube such that the screw auger engages the crushed material between the auger and the tube to convey the same and further grind and separate the material as it is being conveyed;

(e) a dust filter for filtering dust from air; and (f) a conduit for conducting the dust carried by air from the dust exhaust port of the separator means to the dust filter, the dust filter collecting the solid dust and having a discharge port from which the collected dust may be discharged.

* * * * *